Figure 1:
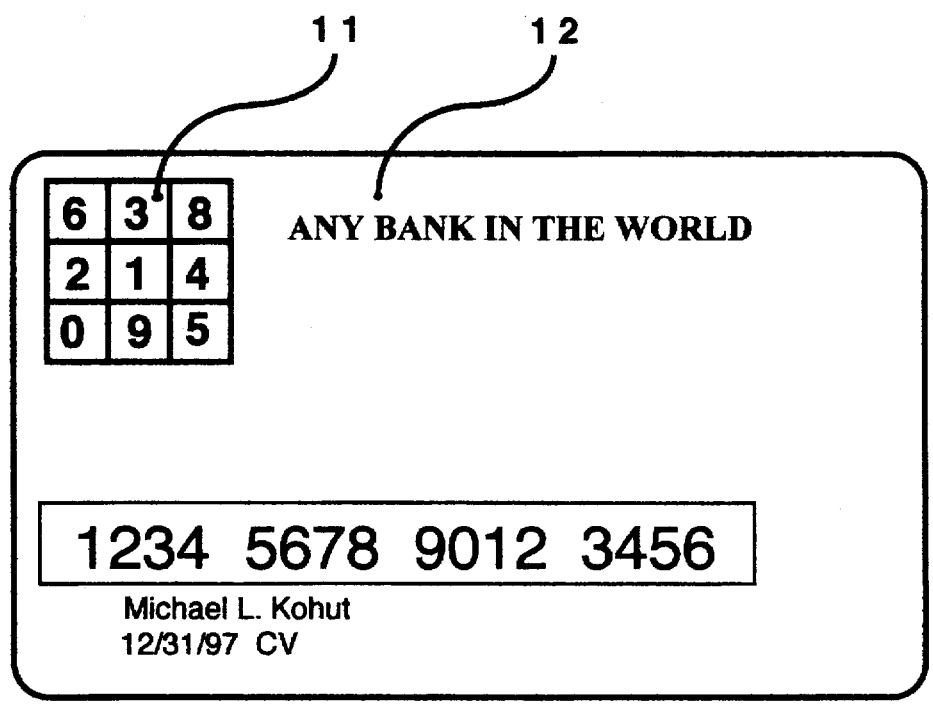

United States Patent [19]
Kohut

[11] Patent Number: 5,742,035
[45] Date of Patent: Apr. 21, 1998

[54] MEMORY AIDING DEVICE FOR CREDIT CARD PIN NUMBERS

[76] Inventor: Michael L. Kohut, 484 Aptos Creek Rd., Aptos, Calif. 95003-3950

[21] Appl. No.: 634,142

[22] Filed: Apr. 19, 1996

[51] Int. Cl.$^6$ .............................. G06K 5/00; G06K 19/06
[52] U.S. Cl. ............................................. 235/380; 235/492
[58] Field of Search ................................. 434/108, 109,
434/222, 223, 236; 235/380, 492, 494,
487; 340/825.31; 283/74, 98, 114

[56] References Cited

U.S. PATENT DOCUMENTS

| | | | |
|---|---|---|---|
| 4,801,787 | 1/1989 | Suzuki | 235/380 |
| 5,246,375 | 9/1993 | Goede | 434/236 |
| 5,259,649 | 11/1993 | Shomron | 283/904 |
| 5,326,964 | 7/1994 | Risser | 235/380 |
| 5,408,082 | 4/1995 | Tagaki et al. | 235/492 |

Primary Examiner—Donald T. Hajec
Assistant Examiner—Thien Minh Le

[57] ABSTRACT

A thin label consisting of a geometric matrix (1) which is applied, embedded, programmed or printed on to the surface of a bank or credit card (2) for the purpose of recalling the specific Personal identification Number (PIN). A sequential pattern is chosen within the matrix. The PIN is installed into the sequential pattern in a predetermined order. The remaining empty spaces within the matrix are filled-in with other numbers or characters to render the PIN encoded. The authorized user of the credit card need only recognize the sequential pattern within the matrix to recall the specific PIN. Other credit card PINs can be recalled by utilizing the same sequential matrix pattern to encode the different PINs. By recognizing a single sequential pattern within the matrix, the user can recall a multitude of PINs without jeopardizing the intended security associated with PIN use.

19 Claims, 2 Drawing Sheets

MEMORY AIDING DEVICE FOR CREDIT CARD PIN NUMBERS

CROSS-REFERENCES TO RELATED APPLICATIONS

Patent Application: Ser. No. 08/486,080 7 Jun., 1995
Disclosure Document Program: 370873 13 Feb., 1995

BACKGROUND

1. Field of Invention

This invention relates to bank cards and credit cards and other devices which require the use of a Personal identification Number (PIN), specifically an improved method of recalling the PIN.

2. Description of Prior Art

A common method of credit card security utilized by most bank and credit card granting organizations, in case the card is lost or stolen, is the use of a Personal identification Number or PIN. The PIN is issued only to the authorized user of the card, by the grantor, and must be memorized by that user. The authorized user of the card is instructed, by the grantor, not to reveal the PIN to any third party. And especially, not to write the PIN on the surface of the card, so as not to compromise the intended level of security. When the user wishes to use the bank or credit card in a cash related transaction, the user is sometimes required to enter the PIN into a computer based device. The computer compares the entered PIN against the encoded PIN recorded on the card. If the two PINs are identical, the transaction is cleared for processing. If the entered PIN is not identical to the recorded PIN, the user is usually prompted to enter the PIN a second time. If the user continues to enter an incorrect PIN, the transaction is aborted. In the case of some Automated Teller Machines (ATM), the card could be confiscated by the ATM and not returned to the user following several incorrect PIN entries.

A PIN usually consist of a four digit numerical code which is easily memorized by the user. However, when the user has multiple bank and/or credit cards in his possession, the task of memory could become difficult rather than simple as originally intended. Some grantors of cards have recognized this limitation and provide the user with the option of choosing a personalized PIN. Personalized PINs allow the user to have the same PIN for all cards in their possession, eliminating the need to remember multiple PINs. However, personalized PINs require that the user write a letter to the grantor specifically requesting a specific PIN of their choosing, or complete a form sent to the user in response to a personalized PIN request. This formality is time consuming for both the user and the grantor and usually delays the issuance of the card. In the case of the grantor, this delay represents lost interest revenues. If a personalized PIN is revealed to an unauthorized user, all credit cards become immediately vulnerable to unauthorized use. The documentation to request new personalized PINs is substantial with respect to time and complexity.

Users can usually remember PINs which are continually used. However, cards of lesser use, like telephone credit cards, challenge the user's memory over the time between infrequent use. To overcome this limitation, some users will conceal the PIN somewhere in a wallet or purse in their possession which diminishes the level of intended security.

Other users simply forget the PIN and never use the card in a cash related transaction where a PIN is required. This again, deprives the user of a very beneficial credit card use relating to immediate cash in the form of a loan; and the grantor, of profits related to non-existing interest charges from a loan which was never initiated.

A memory aiding device, U.S. Pat. No. 5,246,375 to Goede of the Netherlands, consisting of a very large geometric matrix and a second transparent matrix overlay, proved to be to complicated for credit card use. Goede's device was separate and not directly attached to the credit card. Therefore, the user was required to utilize a secondary matrix position code to recall the PIN. An effective memory aiding device for credit cards PINs must be much simpler than Goede's device and attached directly with the specific credit card in question.

An improvement to Goede's device, U.S. Pat. No. 5,259,649 to Shomron of Israel, consisted of printing a plurality of PINs directly onto the surface of a credit card, one of which was the correct PIN. Each PIN is distinguished from the others by varying the font and/or surrounding the PIN with a distinct geometric shape. Shomron's device, unfortunately, drastically reduces the level of security originally intended by the grantor of the credit card. If only eight PINs are printed on the credit card, an unauthorized user has a $\frac{1}{8}$ chance of guessing the correct PIN. My device better maintains the intended level of security by limiting unauthorized users to a $\frac{1}{3024}$ chance of guessing the correct PIN in a 9 position 3×3 square geometric matrix.

Suzuki, U.S. Pat. No. 4,801,787 and Takagi et al., U.S. Pat. No. 5,408,082, both of Japan, describe devices which contain Integrated Circuits (IC) to possibly recall PIN numbers if pre-entered information is coincident with entered information, or through utilization of a hierarchical file structure to gain access to a lower file structure, respectively. In both cases, my device solves the problem of recalling the correct PIN number without the use of expensive ICs, and the supporting technology hardware and software required for implementation. My device is cost effective and efficient and requires no supporting technology.

SUMMARY OF INVENTION

The objects and advantages of my invention are as follows:

a) to provide a method of encoding the user's PIN directly onto the surface of a credit card without compromising the grantor's intended level of security;

b) to provide the user with a method of recalling multiple PINs from many different credit cards by recognizing only a single matrix pattern;

c) to provide the user with an option code to recall multiple matrix patterns if desired;

d) to allow the user to recall PINs from credit cards which are seldom used;

e) to eliminate the need for personalized PINs and the security problems associated with PINs chosen from birth dates, etc.;

f) to eliminate the need for the user to carry concealed PINs increasing his level of personal security;

g) to increase the grantor's profits relating to cash related transactions due to increased card usage;

h) to reduce the grantor's labor associated with personalized PINs and reinforming a user of a forgotten PIN;

i) to increase the ease-of-use and user friendliness of bank or credit card transaction;

Further objects and advantages associated with my invention are to provide the user with a method of changing the coded pattern without changing the PIN. If a user believes that a third party has somehow gained knowledge of his pattern, the level of security provided by my invention can be maintained by simply changing the encoded matrix pattern. The PIN itself is never memorized, but rather, only the matrix pattern in which it resides must be recognized to recall the correct PIN. If the sequential pattern is programmed and stored in the credit card, the geometric matrix could be viewed by the user on a video display. Since the user must only determine the correct sequential pattern, the PIN could be different each time the credit card is placed into an ATM. The user would enter the numbers in the sequential pattern as the PIN to gain access to his account.

My device for recalling a PIN differs from other methods as follows:

1) My device uses a geometric matrix attached directly to the surface of the credit card to encode the PIN.
2) My device uses a sequential pattern within the geometric matrix, which is chosen by the user to encode and recall the PIN.
3) My device does not require the encoded PIN to be in the correct order.
4) My device is much more secure, and the security can be enhanced by increasing the size of the geometric matrix to a 16 position 4×4 square geometric matrix. This would limit an unauthorized user to a 1/43680 chance of guessing the correct PIN.
5) My device can be implemented in the form of a small label which is affixed to the surface of the credit card while maintaining the aesthetic attributes of the credit card.

The existing method of PIN usage suffer from the following disadvantages:

a) Multiple bank and credit cards usually require the authorized user to memorize and remember multiple PINs. If a user forgets a PIN, the service relating to the card is not provided. This can be a major inconvenience for the user and lower interest profits for the grantor.
b) If the user conceals written PINs on his person, this diminishes the level of security intended by the grantor. If a thief observes the user reading PINs from a written list, this could invite a situation which could place the user's safety in jeopardy.
c) When a user can not use a credit card, the grantor is denied the potential interest charges related to the transaction. Many users do not want to go through the embarrassment of requesting the grantor to reveal their PIN. In the user's mind, this is possibly an admission of memory problems or lack of organization. Some users would rather not use the card in a cash related transaction then to go through the perceived embarrassment of requesting the PIN from the grantor.
d) if a user inadvertently forgets the PIN when using an ATM and attempts to guess, the ATM could confiscate the credit card leaving the user at a disadvantage. This could become a major source of anxiety and inconvenience when the user is traveling.
e) If an authorized user has chosen his birthday as his personalized PIN and looses his wallet, an unauthorized user could possibly guess the PIN by trial and error.

DRAWING FIGURES

FIG. #1 shows my invention attached or printed directly onto the surface of a credit card.

FIG. #2 demonstrates the first step in using my device: choosing a sequential matrix pattern.

FIG. #3 demonstrates the second step in using my device: installing a PIN into the chosen sequential matrix pattern.

FIG. #4 demonstrates the third step in using my device: filling in the remaining blank matrix positions with random numbers.

FIG. #5 demonstrates how the matrix will look to an unauthorized user.

REFERENCE NUMERALS IN DRAWING 11)
Invention Geometric Matrix (Matrix) 12) Front surface of a Credit Card

DESCRIPTION OF FIG. #1: THE PREFERRED EMBODIMENT

A typical embodiment of the invention is illustrated in FIG. #1. FIG. #1 represents a typical bank or credit card with the invention geometric matrix attached directly to the surface of the card or printed directly onto the surface of the card. The numerals located inside the matrix contain the encoded PIN.

OPERATION OF PREFERRED EMBODIMENT:
FIG. #1, #2, #3, #4, #5

My invention is a memory aid device which applies to bank and credit cards and other devices which require the use of a Personal Identification Number (PIN) to help the user readily recall the correct PIN. My invention is a geometric matrix, and it's intended use, which is applied directly to the surface of the credit card or other device in the users possession. The user will install the PIN into a selected matrix pattern in a specified progression, within the geometric matrix. The remaining blank areas of the geometric matrix will be filled-in with other random numbers.

To use my invention, the user only needs to recognize a single matrix pattern and not the specific numbers relating to the PIN. This same matrix pattern can be utilized for other credit cards or similar devices to recall a multitude of PINs.

For example: If a user chose the matrix pattern and sequence described in FIG. #2, and the user's PIN was 4582, the user would first install the PIN into the matrix pattern in the correct sequence (#1→#2→#3→#4) as described numerically in FIG. #3.

To recall the correct PIN, the user only needs to recognize the matrix pattern in proper sequence as described in FIG. #2. Next, the user must fill in the blank matrix positions with other random numbers as described in FIG. #4.

The same matrix pattern can be utilized to recall many different PINs within other matrix labels associated with other credit cards. It is much easier to recognize a single matrix pattern rather then a multitude of PINs.

To an unauthorized user, the invention matrix is nothing more than an array of nonsense numbers which very effectively encodes the authorized users PIN. See FIG. #5.

RAMIFICATIONS AND SCOPE OF INVENTION

Accordingly, the reader can now understand that my invention is a device which permits the authorized user of credit cards to recall all the PINs associated with each individual credit card by recognizing only one, single matrix pattern. Since the invention matrix is affixed directly to the surface of the credit card, the correct PIN is readily assessable to the authorized user. Also, the intended level of security associated with a PIN is never compromised since an unauthorized user has no knowledge of the matrix pattern and encoded PIN.

Although the descriptions above contain many specificities, these should not be construed as limiting the scope of my invention, but as merely providing illustrations of some of the presently preferred embodiments of this invention. For example, the geometric size and shape of the invention matrix may be changed to better serve a particular application; colors may be utilized to indicate some key point within the invention matrix; an additional matrix space may be added to indicate to the authorized user which matrix pattern to use in the case where multiple patterns are utilized; etc.

Thus, the scope of this invention should be determined by the appended claims and their legal equivalents, rather than by the examples provided.

I claim:

1. A method for recalling a specific set of characters in a geometric matrix positioned on or in a device, comprising:

choosing a pattern with a specific progression, which creates a sequential pattern within said geometric matrix, so that said specific set of characters will exactly fill all positions in said chosen sequential pattern;

placing the specific set of characters within the geometric matrix, in the sequential pattern, in predetermined order;

positioning a random set of characters in selected non-sequential pattern vacant positions within said geometric matrix, so that the sequential pattern positions of the specific set of characters in the geometric matrix and said random set of characters in said non-sequential pattern positions within the geometric matrix fill all positions within the geometric matrix; and Recognizing the sequential pattern within the geometric matrix, allows a determination of the specific set of characters in correct order.

2. The method of claim 1, wherein said geometric matrix is printed on the surface of said device.

3. The method of claim 1, wherein said geometric matrix is embedded in said device.

4. The method of claim 2, wherein said geometric matrix is printed on a label and attached to said surface of said device.

5. The method of claim 1, wherein said geometric matrix is programmed and stored within said device for electronic display.

6. The method of claim 1, wherein said specific set of characters are numbers.

7. The method of claim 1, wherein said specific set of characters are letters.

8. The method of claim 1, wherein said random set of characters are numbers.

9. The method of claim 1, wherein said random set of characters are letters.

10. The method of claim 1, wherein said device is a credit card.

11. A method for recalling a credit card Personal Identification Number (PIN) from a geometric matrix positioned on or in said credit card comprising:

choosing a pattern with a specific progression, which creates a sequential pattern within said geometric matrix, so that said PIN will exactly fill all positions in said chosen sequential pattern;

placing said PIN within the geometric matrix in said sequential pattern in a predetermined order; and positioning a random set of characters in selected non-sequential pattern vacant positions within said geometric matrix, so that the sequential pattern positions of said PIN in the geometric matrix and said random set of characters in said non-sequential pattern positions within the geometric matrix fill all positions within the geometric matrix; and Recognizing the sequential pattern within the geometric matrix, allows a determination of the PIN in correct order.

12. The method of claim 11, wherein said geometric matrix is printed on the surface of said credit card.

13. The method of claim 11, wherein said geometric matrix is embedded in said credit card.

14. The method of claim 12, wherein said geometric matrix is printed on a label which is attached to the surface of said credit card.

15. The method of claim 11, wherein said geometric matrix is programmed and stored within said credit card for electronic display.

16. The method of claim 11, wherein said specific set of characters are numbers.

17. The method of claim 11, wherein said specific set of characters are letters.

18. The method of claim 11, wherein said random set of characters are numbers.

19. The method of claim 11, wherein said random set of characters are letters.

* * * * *